US010815118B2

(12) United States Patent
Shock

(10) Patent No.: US 10,815,118 B2
(45) **Date of Patent: *Oct. 27, 2020**

(54) MOBILE DISTRIBUTION STATION HAVING SENSOR COMMUNICATION LINES ROUTED WITH HOSES

(71) Applicant: Fuel Automation Station, LLC, Birmingham, MI (US)

(72) Inventor: Ricky Dean Shock, Victoria, TX (US)

(73) Assignee: FUEL AUTOMATION STATION, LLC, Birmingham, MI (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/148,403

(22) Filed: Oct. 1, 2018

(65) Prior Publication Data

US 2019/0031496 A1 Jan. 31, 2019

Related U.S. Application Data

(63) Continuation of application No. 15/290,304, filed on Oct. 11, 2016, now Pat. No. 10,087,065.

(51) Int. Cl.
*B67D 7/04* (2010.01)
*B67D 7/46* (2010.01)
(Continued)

(52) U.S. Cl.
CPC ............... *B67D 7/465* (2013.01); *B67D 7/04* (2013.01); *B67D 7/40* (2013.01); *B67D 7/845* (2013.01); *B67D 2210/0006* (2013.01)

(58) Field of Classification Search
CPC .......... B67D 7/465; B67D 7/40; B67D 7/845; B67D 2210/0006
(Continued)

(56) References Cited

U.S. PATENT DOCUMENTS

| | | | |
|---|---|---|---|
| 2,340,070 | A | 1/1944 | McCauley et al. |
| 2,516,150 | A | 7/1950 | Samiran |

(Continued)

FOREIGN PATENT DOCUMENTS

| | | |
|---|---|---|
| DE | 1147397 | 4/1963 |
| DE | 20106400 | 10/2001 |

(Continued)

OTHER PUBLICATIONS

Shimazaki, H. (1986). Development of centralized fueling and management system of kerosene heating machine. Nisseki Technical Review, vol. 28(4). Jul. 1986. pp. 184-188.

(Continued)

*Primary Examiner* — Nicolas A Arnett
(74) *Attorney, Agent, or Firm* — Carlson, Gaskey & Olds, P.C.

(57) ABSTRACT

A distribution station includes a mobile trailer, a pump, a manifold connected with the pump, reels, flow passages connected to the manifold and running through the reels, hoses, connected the flow passages via the reels, valves situated between the manifold and the reels and operable to control fluid flow through the flow passages, fluid level sensors connected or connectable with the hoses, and a controller configured to operate the valves responsive to fluid level thresholds to control fluid flow to the hoses.

18 Claims, 4 Drawing Sheets

(51) Int. Cl.
*B67D 7/40* (2010.01)
*B67D 7/84* (2010.01)

(58) Field of Classification Search
USPC .............................................. 141/94–95, 231
See application file for complete search history.

(56) References Cited

U.S. PATENT DOCUMENTS

| | | | | |
|---|---|---|---|---|
| 2,769,572 | A | 11/1956 | Harman et al. | |
| 2,777,461 | A | 1/1957 | Wildhaber | |
| 2,966,921 | A | 1/1961 | Whiteman | |
| 3,028,010 | A | 4/1962 | Headrick | |
| 3,136,295 | A | 6/1964 | Gramo | |
| 3,547,141 | A | 12/1970 | Alexander | |
| 3,605,798 | A | 9/1971 | Green et al. | |
| 3,618,643 | A | 11/1971 | Thomson | |
| 3,625,399 | A | 12/1971 | Heisler | |
| 3,677,284 | A | 7/1972 | Mendez | |
| 3,881,509 | A | 5/1975 | Newton | |
| 4,139,019 | A | 2/1979 | Bresie et al. | |
| 4,284,210 | A | 8/1981 | Horak | |
| 4,511,311 | A | 4/1985 | Olson | |
| 4,591,115 | A | 5/1986 | DeCarlo | |
| 4,651,788 | A | 3/1987 | Grosskreuz et al. | |
| 4,728,005 | A | 3/1988 | Jacobs et al. | |
| 4,930,665 | A | 6/1990 | Devine | |
| 5,406,988 | A | 4/1995 | Hopkins | |
| 5,454,408 | A | 10/1995 | DiBella et al. | |
| 5,465,766 | A | 11/1995 | Siegele et al. | |
| 5,503,199 | A | 4/1996 | Whitley, II et al. | |
| 5,538,051 | A | 7/1996 | Brown et al. | |
| 5,551,309 | A | 9/1996 | Goossens et al. | |
| 5,651,400 | A | 7/1997 | Corts et al. | |
| 5,660,358 | A | 8/1997 | Grafwallner et al. | |
| 5,708,424 | A | 1/1998 | Orlando et al. | |
| 5,749,339 | A | 5/1998 | Graham et al. | |
| 5,887,567 | A | 3/1999 | White | |
| 5,927,603 | A | 7/1999 | McNabb | |
| 5,884,675 | A | 12/1999 | Krasnov | |
| 6,098,646 | A | 8/2000 | Hennemann et al. | |
| 6,206,056 | B1 | 3/2001 | Lagache | |
| 6,564,615 | B1 | 5/2003 | Carter | |
| 6,601,000 | B1 | 7/2003 | Barlian et al. | |
| 6,651,706 | B2 | 11/2003 | Litt | |
| 6,697,705 | B2 | 2/2004 | Johnson et al. | |
| 6,745,801 | B1 | 6/2004 | Cohen | |
| 6,755,225 | B1 | 6/2004 | Niedwiecki et al. | |
| 6,761,194 | B1 | 7/2004 | Blong | |
| 6,779,569 | B1 | 8/2004 | Teer, Jr. et al. | |
| 6,786,245 | B1 | 9/2004 | Eichelberger et al. | |
| 7,063,276 | B2 | 6/2006 | Newton | |
| 7,106,026 | B2 | 9/2006 | Moore | |
| 7,353,808 | B2 | 4/2008 | Kakoo | |
| 7,415,995 | B2 | 8/2008 | Plummer et al. | |
| 7,458,543 | B2 | 12/2008 | Cutler et al. | |
| 7,568,507 | B2 | 8/2009 | Farese et al. | |
| 7,602,143 | B2 | 12/2009 | Capizzo | |
| 7,628,182 | B2 | 12/2009 | Poulter | |
| 7,937,215 | B2 | 5/2011 | Humphrey | |
| 7,938,151 | B2 | 5/2011 | Hockner | |
| 8,069,885 | B2 | 12/2011 | Kederer | |
| 8,448,750 | B2 | 5/2013 | Gaugush et al. | |
| 9,346,662 | B2 | 5/2016 | Van Vliet et al. | |
| 9,371,830 | B2 | 6/2016 | Moffitt, Jr. | |
| 9,371,831 | B2 | 6/2016 | Moffitt, Jr. | |
| 9,434,598 | B2 | 9/2016 | Pick | |
| 9,586,805 | B1 | 3/2017 | Shock | |
| 9,725,295 | B2 | 8/2017 | McKay | |
| 9,790,080 | B1 * | 10/2017 | Shock | B67D 7/3272 |
| 9,815,683 | B1 * | 11/2017 | Kalala | B67D 7/362 |
| 9,981,840 | B2 * | 5/2018 | Shock | B67D 7/465 |
| 10,087,065 | B2 * | 10/2018 | Shock | B67D 7/465 |
| 10,150,662 | B1 * | 12/2018 | Shock | B67D 7/74 |
| 10,196,258 | B2 * | 2/2019 | Kalala | B67D 7/40 |
| 10,289,126 | B2 * | 5/2019 | Shock | G05D 9/12 |
| 10,303,190 | B2 * | 5/2019 | Shock | G05D 9/12 |
| 10,442,676 | B1 * | 10/2019 | Walther | B65H 75/4478 |
| 10,513,426 | B2 * | 12/2019 | Shock | B67D 7/3218 |
| 2001/0017815 | A1 | 8/2001 | Ackermann et al. | |
| 2004/0163731 | A1 | 8/2004 | Eichelberger | |
| 2004/0187950 | A1 | 9/2004 | Cohen | |
| 2005/0109561 | A1 | 5/2005 | Chopra | |
| 2007/0079891 | A1 | 4/2007 | Farese et al. | |
| 2007/0164031 | A1 | 7/2007 | Holz | |
| 2007/0181212 | A1 | 8/2007 | Fell | |
| 2011/0197988 | A1 | 8/2011 | Van Vliet | |
| 2016/0076533 | A1 | 3/2016 | Moffitt, Jr. | |
| 2019/0119096 | A1 * | 4/2019 | Haile | B67D 7/0401 |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Technical Document. Surface vehicle standard. SAE International. Sep. 2014. pp. 1-5.
Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.
Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Service. Retrieved Aug. 23, 2016 from: http://www.fracshack.com.
Frac Shack International. Frac Shack Series—Series A. Retrieved Aug. 23, 2016 from: http://www.fracshack.com.
Frac Shack International. Frac Shack Series—Series B. Retrieved Aug. 23, 2016 from: http://www.fracshack.com.
Frac Shack International. Frac Shack Series—Series C. Retrieved Aug. 23, 2016 from: http://www.fracshack.com.
Frac Shack International. Frac Shack Series—Series D. Retrieved Aug. 23, 2016 from: http://www.fracshack.com.
Frac Shack International. Frac Shack Series—Series E. Retrieved Aug. 23, 2016 from: http://www.fracshack.com.
Frac Shack International. Frac Shack Series—Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.

* cited by examiner

MOBILE DISTRIBUTION STATION HAVING SENSOR COMMUNICATION LINES ROUTED WITH HOSES

CROSS-REFERENCE TO RELATED APPLICATION

The present disclosure is a continuation of U.S. patent application Ser. No. 15/290,304 filed Oct. 11, 2016.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station according to an example of the present disclosure includes a mobile trailer, a pump, a manifold connected with the pump, reels, flow passages connected to the manifold and running through the reels, hoses, connected the flow passages via the reels, valves situated between the manifold and the reels and operable to control fluid flow through the flow passages, fluid level sensors connected or connectable with the hoses, and a controller configured to operate the valves responsive to fluid level thresholds to control fluid flow to the hoses.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
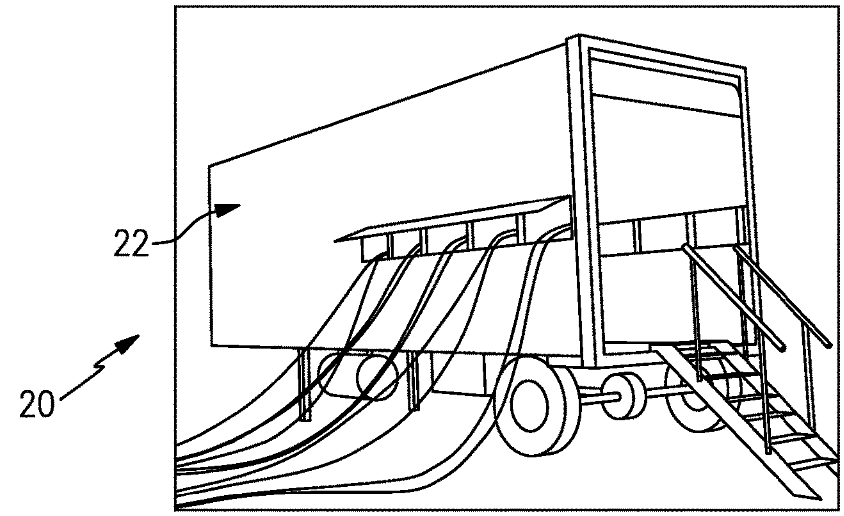
FIG. 1 illustrates an example mobile distribution station.
Figure 2:
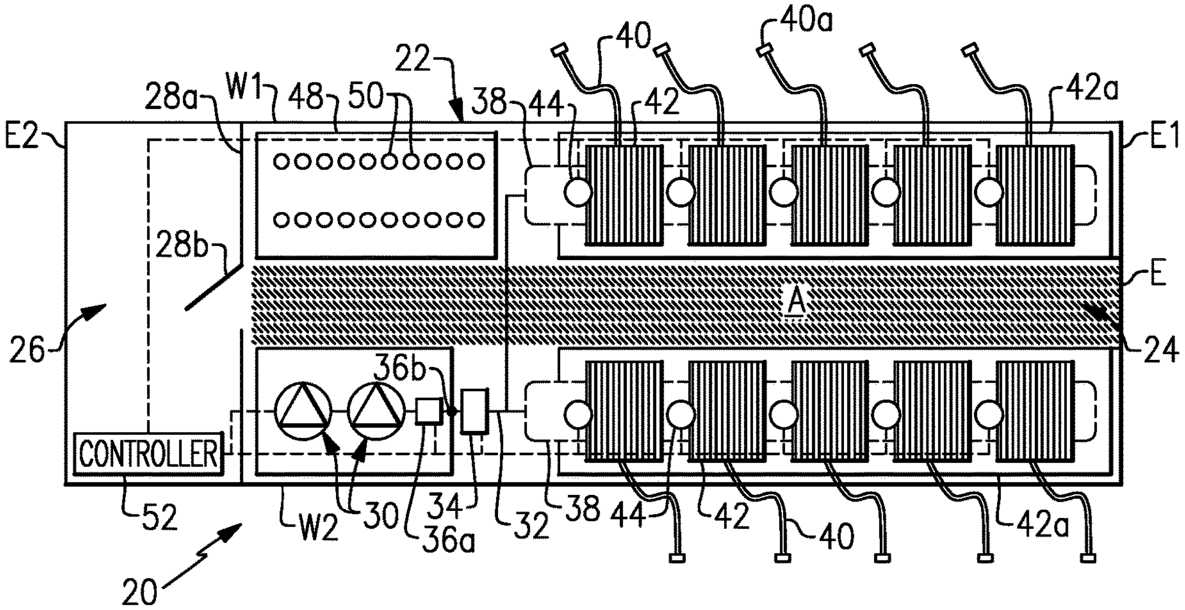
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28*a* that has an inside door 28*b*.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with a high precision register 34 for metering fuel. The fuel line 32 may include, but is not limited to, hard piping. In this example, the fuel line 32 includes a filtration and air eliminator system 36*a* and one or more sensors 36*b*. Although optional, the system 36*a* is beneficial in many implementations, to remove foreign particles and air from the fuel prior to delivery to the equipment. The one or more sensors 36*b* may include a temperature sensor, a pressure sensor, or a combination thereof, which assist in fuel distribution management.

The fuel line 32 is connected with one or more manifolds 38. In the illustrated example, the station 20 includes two manifolds 38 that arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

Figure 3:
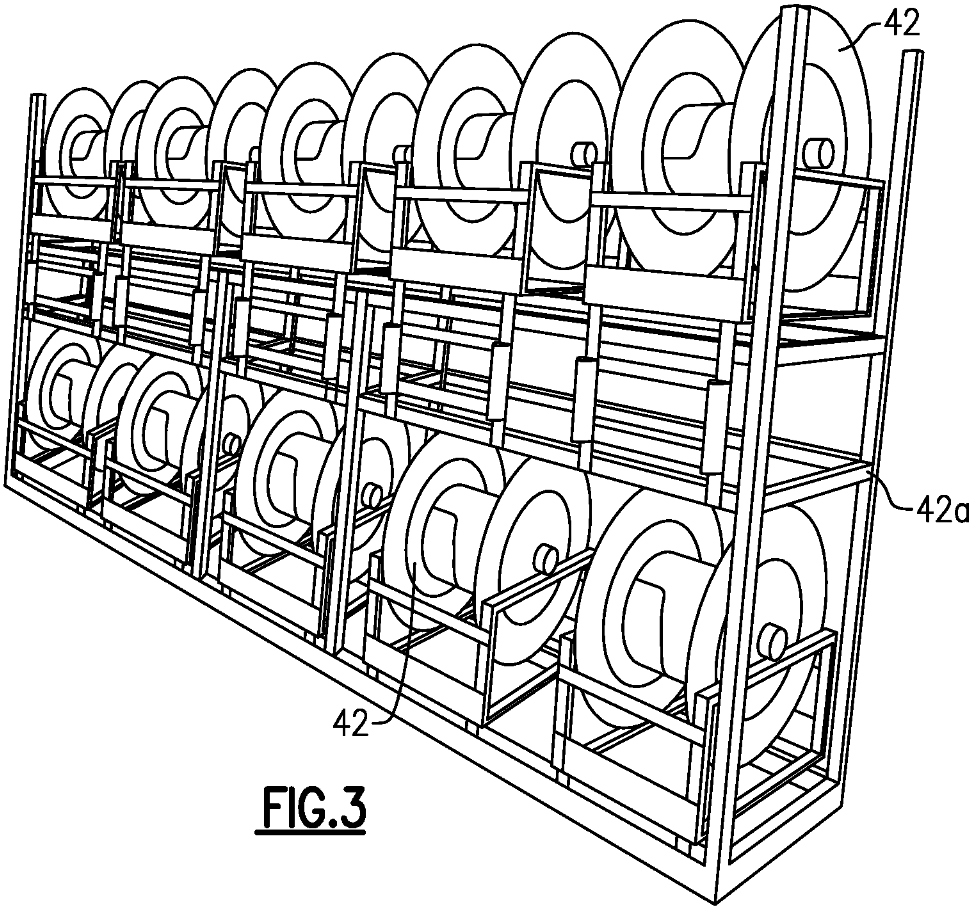
FIG. 3 illustrates an isolated view of hose reels on a support rack used in a mobile distribution station.

As shown in an isolated view in FIG. 3, the reels 42 are mounted on a support rack 42*a*. In this example, the support rack 42*a* is configured with upper and lower rows of reels 42. Each row has five reels 42 such that each support rack 42*a* provides ten reels 42 and thus ten hoses 40. There are two support racks 42*a* (FIG. 2) arranged on opposed sides of the first compartment 24, with an aisle (A) that runs between the support racks 42*a* from an outside door E to the inside door 28*b*. The station 20 therefore provides twenty hoses 40 in the illustrated arrangement, with ten hoses 40 provided on each side of the station 20. As will be appreciated, fewer or additional reels and hoses may be used in alternative examples.

Figure 4:
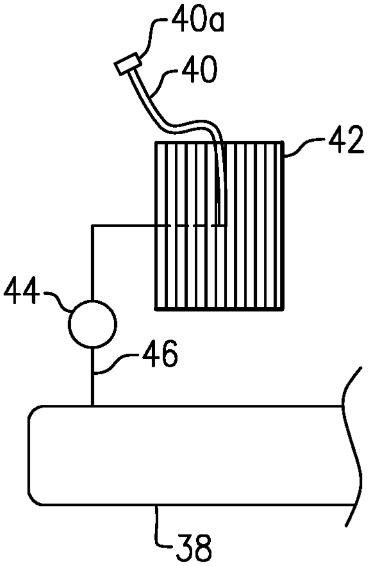
FIG. 4 illustrates an example of a connection between a manifold, a control valve, and a reel.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40*a* and each integrated fuel cap sensor 50 may have a corresponding mating connector to facilitate rapid connection and disconnection of the hose 40 with the integrated fuel cap sensor 50. For example, the connector end 40*a* and mating connector on the integrated fuel cap sensor 50 form a hydraulic quick-connect.

At least the control valves 44, pump or pumps 30, sensor or sensors 36*b*, and register 34 are in communication with a controller 52 located in the second compartment 26. As an example, the controller 52 includes software, hardware, or both that is configured to carry out any of the functions described herein. In one further example, the controller 52 includes a programmable logic controller with a touch-screen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down. The controller 52 can also be programmed with a failsafe measure related to the operation of the fuel cap sensors 50. As an example, once a control valve 44 is open, if the controller 52 does not detect a change in fuel level from the fuel cap sensor 50 associated with the control valve 44 within a preset time period, the controller 52 shuts the pump 30 off and closes the control valve 44. Thus, if a hose 40 were to rupture, spillage of fuel is limited to the volume of fuel in the hose 40. For instance, the preset time period may be three seconds, six seconds, ten seconds, or fifteen seconds, which may limit spillage to approximately fifteen gallons for a given size of hose.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

In general, hard-wiring in a hot-refueling environment presents several challenges. For example, a site has many workers walking about and typically is located on rough terrain. Thus, as will be described below, each integrated fuel cap sensor 50 is hard-wired through the associated hose 40 to the controller 52.

Figure 5:
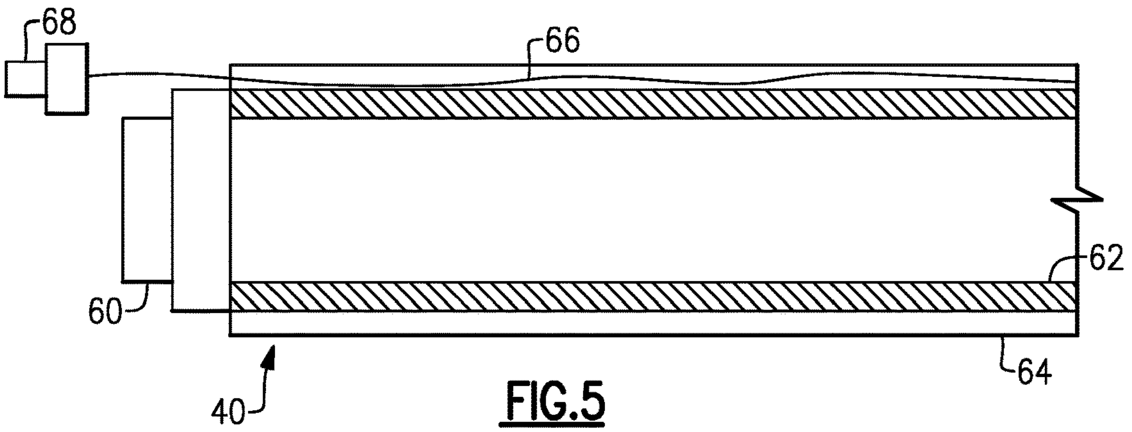
FIG. 5 illustrates a sectioned view of an example hose for a mobile distribution station.

FIG. 5 illustrates a representative portion of one of the hoses 40 and, specifically, the end of the hose 40 that will be located at the fuel tank of the equipment being refueled. In this example, the hose 40 includes a connector 60 at the end for detachably connecting the hose 40 to the integrated fuel cap sensors 50. The hose 40 is formed of a tube 62 and a sleeve 64 that circumscribes the tube 62. As an example, the tube 62 may be a flexible elastomeric tube and the sleeve 64 may be a flexible fabric sleeve. The sleeve 64 is generally loosely arranged around the tube 62, although the sleeve 64 may closely fit on the tube 62 to prevent substantial slipping of the sleeve 64 relative to the tube 62 during use and handling. Optionally, to further prevent slipping and/or to secure the sleeve 64, bands may be tightened around the hose 40. As an example, one or more steel or stainless steel bands can be provided at least near the ends of the hose 40.

A plurality of sensor communication lines 66 (one shown) are routed with or in the respective hoses 40. For instance, each line 66 may include a wire, a wire bundle, and/or multiple wires or wire bundles. In one further example, the line 66 is a low milliamp intrinsic safety wiring, which serves as a protection feature for reducing the concern for operating electrical equipment in the presence of fuel by limiting the amount of thermal and electrical energy available for ignition. In this example, the line 66 is routed through the hose 40 between (radially) the tube 62 and the sleeve 64. The sleeve 64 thus serves to secure and protect the line 66, and the sleeve 64 may limit spill and spewing if there is a hose 40 rupture. In particular, since the line 66 is secured in the hose 40, the line 66 does not present a tripping concern for workers. Moreover, in rough terrain environments where there are stones, sand, and other objects that could damage the line 66 if it were free, the sleeve 64 shields the line 66 from direct contact with such objects. In further examples, the line 66 may be embedded or partially embedded in the tube 62 or the sleeve 64.

Figure 6:
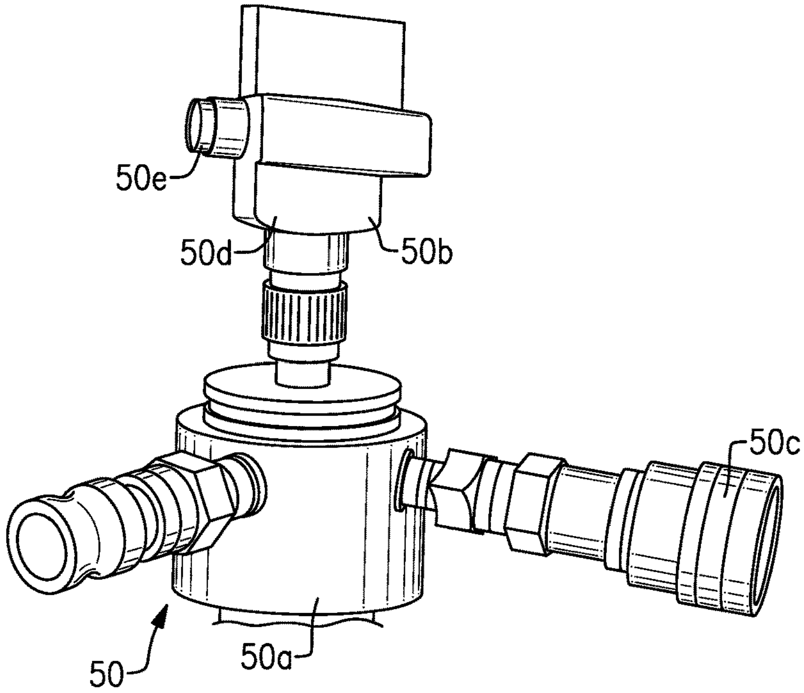
FIG. 6 illustrates an example of an integrated cap sensor for a mobile distribution station.

In this example, the line 66 extends out from the end of the hose 40 and includes a connector 68 that is detachably connectable with a respective one of the integrated fuel cap sensors 50. For example, FIG. 6 illustrates a representative example of one of the integrated fuel cap sensors 50. The integrated fuel cap sensor 50 includes a cap portion **50*a* and a level sensor portion 50*b*. The cap portion 50*a* is detachably connectable with a port of a fuel tank. The cap portion 50*a* includes a connector port 50*c*, which is detachably connectable with the connector 60 of the hose 40. The sensor portion 50*b* includes a sensor 50*d* and a sensor port 50*e* that is detachably connectable with the connector 68 of the line 66. The fuel cap sensor 50 may also include a vent port that attaches to a drain hose, to drain any overflow into a containment bucket and/or reduce air pressure build-up in a fuel tank. Thus, a user may first mount the cap portion 50*a* on the fuel tank of the equipment, followed by connecting the hose 40 to the port 50*c* and connecting the line 66 to the port 50*e***.

The sensor **50*d* may be any type of sensor that is capable of detecting fluid or fuel level in a tank. In one example, the sensor 50*d* is a guided wave radar sensor. A guided wave radar sensor may include a transmitter/sensor that emits radar waves, most typically radio frequency waves, down a probe. A sheath may be provided around the probe. For example, the sheath may be a metal alloy (e.g., stainless steel or aluminum) or polymer tube that surrounds the probe. One or more bushings may be provided between the probe and the sheth, to separate the probe from the sheath. The sheath shields the probe from contact by external objects, the walls of a fuel tank, or other components in a fuel tank, which might otherwise increase the potential for faulty sensor readings. The probe serves as a guide for the radar waves. The radar waves reflect off of the surface of the fuel and the reflected radar waves are received into the transmitter/sensor. A sensor controller determines the "time of flight" of the radar waves, i.e., how long it takes from emission of the radar waves for the radar waves to reflect back to the transmitter/sensor. Based on the time, the sensor controller, or the controller 52** if the sensor controller does not have the capability, determines the distance that the radar waves travel. A longer distance thus indicates a lower fuel level (farther away) and a shorter distance indicates a higher fuel level (closer).

Figure 7:
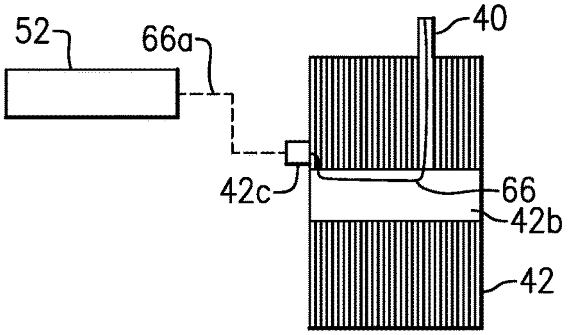
FIG. 7 illustrates an example of the routing of a sensor communication line through a reel in a mobile distribution station.

The line 66 routes through the hose 40 and back to the reel 42 in the trailer 22. For example, the line 66 is also routed or hard-wired through the reel 42 to the controller 52. FIG. 7 illustrates a representative example of the routing in the reel 42. In this example, the reel 42 includes a spindle **42*b* about which the reel is rotatable. The spindle 42*b* may be hollow, and the line 66 may be routed through the spindle 42*b*. The reel 42 may also include a connector 42*c* mounted thereon. The connector 42*c* receives the line 66 and serves as a port for connection with another line 66*a* to the controller 52**.

The lines **66*a* may converge to one or more communication junction blocks or "bricks" prior to the controller 52. The communication junction blocks may serve to facilitate the relay of the signals back to the controller 52. The communication junction blocks may alternatively or additionally serve to facilitate identification of the lines 66, and thus the signals, with respect to which of the hoses a particular line 66 is associated with. For instance, a group of communication junction blocks may have unique identifiers and the lines 66 into a particular communication junction block may be associated with identifiers. A signal relayed into the controller 52 may thus be associated with the identifiers of the communication junction blocks and a particular line 66 of that communication junction block in order to identify which hose 40 the signal is to be associated with. The valves 44 may also communicate with the controller 52** in a similar manner through the communication junction blocks.

As can be appreciated from the examples herein, the station 20 permits continuous hot-refueling with enhanced reliability. While there might generally be a tendency to choose wireless sensor communication for convenience, a hard-wired approach mitigates the potential for signal interference that can arise with wireless. Moreover, by hard-wiring the sensors through the hoses to the controller, wired communication lines are protected from exposure and do not pose additional concerns for workers on a site.

Figure 8:
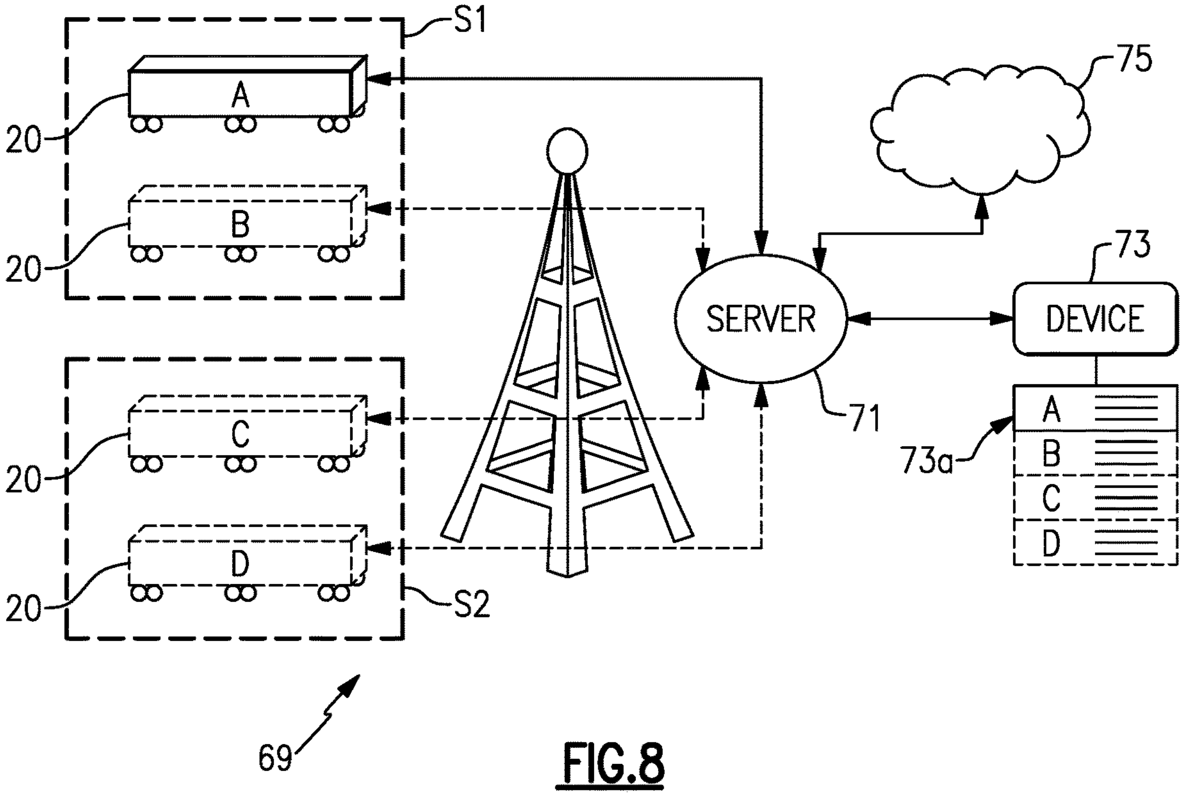
FIG. 8 illustrates a system that can be used to remotely monitor and manage one or more mobile distribution stations.

FIG. 8 illustrates a system 69 for remotely monitoring and/or managing at least one mobile distribution station 20 (A). It is to be appreciated that the system 69 may include additional mobile distribution stations, shown in phantom at 20 (B), 20 (C), and 20 (D) (collectively mobile distribution stations 20), for example. The mobile distribution stations 20 may be located at a single work site or located across several different work sites S1 and S2. Each mobile distribution station 20 is in communication with one or more servers 71 that are remotely located from the mobile distribution stations 20 and work sites S1/S2. In most implementations, the communication will be wireless.

The server 71 may include hardware, software, or both that is configured to perform the functions described herein. The server 71 may also be in communication with one or more electronic devices 73. The electronic device 73 is external of or remote from the mobile fuel distribution stations 20. For example, the electronic device 73 may be, but is not limited to, a computer, such as a desktop or laptop computer, a cellular device, or tablet device. The electronic device 73 may communicate and interact in the system 69 via data connectivity, which may involve internet connectivity, cellular connectivity, software, mobile application, or combinations of these.

The electronic device 73 may include a display 73*a*, such as an electronic screen, that is configured to display the fuel operating parameter data of each of the mobile distribution stations 20. As an example, the electronic device 73 may display in real-time the operating parameter data of each of the mobile distribution stations 20 in the system 69 to permit remote monitoring and management control of the mobile distribution stations 20. For instance, the operating parameter data may include fuel temperature, fuel pressure, fuel flow, total amount of fuel distributed, operational settings (e.g., low and high fuel level thresholds), or other parameters.

The server 71 may also be in communication with one or more cloud-based devices 75. The cloud-based device 75 may include one or more servers and a memory for communicating with and storing information from the server 71.

The server 71 is configured to communicate with the mobile distribution stations 20. Most typically, the server 71 will communicate with the controller 52 of the mobile distribution station 20. In this regard, the controller 52 of each mobile distribution station 20 may be include hardware, software, or both that is configured for external communication with the server 71. For example, each controller 52 may communicate and interact in the system 69 via data connectivity, which may involve internet connectivity, cellular connectivity, software, mobile application, or combinations of these.

The server 71 is configured to receive operating parameter data from the mobile distribution stations 20. The operating parameter data may include or represent physical measurements of operating conditions of the mobile distribution station 20, status information of the mobile distribution station 20, setting information of the mobile distribution station 20, or other information associated with control or management of the operation of the mobile distribution station 20.

For example, the server 71 utilizes the information to monitor and auto-manage the mobile distribution station 20. The monitoring and auto-management may be for purposes of identifying potential risk conditions that may require shutdown or alert, purposes of intelligently enhancing operation, or purposes of reading fuel or fluid levels in real-time via the sensors 50. As an example, the server 71 may utilize the information to monitor or display fuel or fluid levels, or determine whether the fuel operating parameter data is within a preset limit and send a control action in response to the operating parameter data being outside the preset limit. As will described in further detail below, the control action may be a shutdown instruction to the mobile fuel distribution stations 20, an adjustment instruction to the mobile fuel distribution stations 20, or an alert to the electronic device 73.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
- a mobile trailer;
- a pump on the mobile trailer;
- a manifold on the mobile trailer and connected with the pump;
- a plurality of reels on the mobile trailer;
- a plurality of flow passages, each said flow passage being connected to the manifold and running through a respective one of the reels;
- a plurality of hoses, each said hose being connected with a respective one of the flow passages via a respective one of the reels;
- a plurality of valves on the mobile trailer, each said valve situated between the manifold and a respective different one of the reels and being operable to control fluid flow through a respective one of the flow passages;
- a plurality of fluid level sensors, each said fluid level sensor being connected or connectable with a respective different one of the hoses; and
- a controller configured to operate the valves responsive to fluid level thresholds to control fluid flow to the hoses.

2. The distribution station as recited in claim 1, wherein the controller is configured to determine fluid levels based on signals from the fluid level sensors and determine whether one or more of the fluid levels are below one or more of the fluid level thresholds.

3. The distribution station as recited in claim 2, wherein the controller is configured to open the valves for which the fluid levels are below the fluid level thresholds.

4. The distribution station as recited in claim 2, further comprising a plurality of sensor communication lines, each said sensor communication line being connected or connectable with a respective different one of the fluid level sensors, and each said sensor communication line being routed with a respective different one of the hoses.

5. The distribution station as recited in claim 4, wherein each of the hoses includes a tube and a sleeve that circumscribes the tube, and each said sensor communication line is routed in the respective different one of the hoses between the tube and the sleeve.

6. The distribution station as recited in claim 5, wherein each said sensor communication line is routed through a respective different one of the reels.

7. The distribution station as recited in claim 6, further comprising a plurality of connectors, each of the connectors being mounted on a respective different one of the reels and each of the connectors receiving a respective different one of the sensor communication lines.

8. The distribution station as recited in claim 7, wherein each of the reels includes a respective spindle, and each of the sensor communication lines is routed through a respective different one of the spindles.

9. The distribution station as recited in claim 8, wherein controller is operable to open and close the plurality of valves responsive to a fuel level threshold.

10. A distribution station comprising:

a mobile trailer;

a pump on the mobile trailer;

a manifold on the mobile trailer and connected with the pump;

a plurality of reels on the mobile trailer;

a plurality of hoses, each said hose being connected with the manifold and each said hose including a tube and a sleeve that circumscribes the tube;

a plurality of valves on the mobile trailer, each said valve situated between the manifold and a respective different one of the hoses and being operable to control fluid flow from the manifold to the respective different one of the hoses;

a plurality of fluid level sensors, each said fluid level sensor being connected or connectable with a respective different one of the hoses; and a controller configured to operate the valves responsive to fluid level thresholds to control fluid flow to the hoses.

11. The distribution station as recited in claim 10, wherein the sleeve is a fabric sleeve.

12. The distribution station as recited in claim 10, further comprising bands around the hoses, the bands securing the sleeve on the tube.

13. The distribution station as recited in claim 12, wherein the bands are steel.

14. The distribution station as recited in claim 10, further comprising a communication line between the sleeve and the tube.

15. A distribution station comprising:

a mobile trailer including a pump, a manifold connected with the pump, reels, flow passages connected to the manifold and running through the reels, hoses connected with the flow passages via the reels and each of the hoses including a tube and a sleeve that circumscribes the tube, valves situated between the manifold and the reels and operable to control fluid flow through the flow passages, fluid level sensors connected or connectable with the hoses, and a controller configured to operate the valves responsive fluid level thresholds to control fluid flow to the hoses.

16. The distribution station as recited in claim 15, wherein the controller is configured to determine fluid levels based on signals from the fluid level sensors, determine whether one or more of the fluid levels are below one or more of the fluid level thresholds, and open the valves for which the fluid levels are below the fluid level thresholds.

17. The distribution station as recited in claim 16, further comprising a plurality of sensor communication lines, each said sensor communication line being connected or connectable with a respective different one of the fluid level sensors.

18. The distribution station as recited in claim 17, wherein each said sensor communication line is routed in the respective different one of the hoses between the tube and the sleeve.

* * * * *